United States Patent
Povirk et al.

(10) Patent No.: US 8,156,843 B2
(45) Date of Patent: Apr. 17, 2012

(54) VOLTAGE CONTROL OF A LOCKING DIFFERENTIAL

(75) Inventors: Jacob M. Povirk, Franklin, MI (US);
Joseph J. Torres, Dearborn, MI (US);
Brian J. Andonian, Plymouth, MI (US);
Jihong Guo, Ann Arbor, MI (US);
Patrick Meloche, Northville, MI (US);
Kenneth G. Walega, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 623 days.

(21) Appl. No.: 12/419,384

(22) Filed: Apr. 7, 2009

(65) Prior Publication Data

US 2010/0256879 A1 Oct. 7, 2010

(51) Int. Cl.
*F16H 48/12* (2012.01)

(52) U.S. Cl. ............................ 74/650; 475/231; 475/249

(58) Field of Classification Search .................... 74/650; 475/231, 233, 235, 237, 249, 250
See application file for complete search history.

(56) References Cited

U.S. PATENT DOCUMENTS

| | | | |
|---|---|---|---|
| 4,860,208 A | 8/1989 | Bantle | |
| 4,989,686 A | 2/1991 | Miller et al. | |
| 5,079,708 A | 1/1992 | Brown | |
| 5,899,951 A | 5/1999 | Babbel et al. | |
| 6,105,702 A | 8/2000 | Showalter | |
| 6,604,041 B2 | 8/2003 | Hessmert et al. | |
| 7,175,557 B2 | 2/2007 | Kirkwood et al. | |
| 7,325,664 B2 * | 2/2008 | Fusegi | 192/84.92 |
| 7,356,401 B2 | 4/2008 | Romer et al. | |
| 7,395,891 B2 | 7/2008 | Barrette et al. | |
| 7,421,327 B2 | 9/2008 | Romer et al. | |
| 7,553,255 B2 * | 6/2009 | Torres et al. | 477/35 |
| 2007/0142157 A1 * | 6/2007 | Nofzinger et al. | 475/231 |
| 2007/0270275 A1 * | 11/2007 | Kleinhans et al. | 475/231 |
| 2008/0004783 A1 | 1/2008 | Mizon et al. | |
| 2009/0167119 A1 * | 7/2009 | Nakayama et al. | 310/49 R |

* cited by examiner

*Primary Examiner* — Justin Holmes

(74) *Attorney, Agent, or Firm* — David B. Kelley, Esq.; MacMillan, Sobanski & Todd, LLC

(57) ABSTRACT

A method for controlling a locking differential includes determining a temperature-dependent reference voltage at which a coil locks the differentia, determining an electric potential of a battery, using the battery to energize the coil and lock the differential, if the electric potential is equal to or greater than the reference voltage for a current temperature, and maintaining the differential unlocked, if the electric potential is less than the reference voltage.

8 Claims, 3 Drawing Sheets

| | TFT= -100F | TFT= -40F | TFT= 0F | TFT= 100F | TFT= 150F | TFT= 200F | TFT= 225F | TFT= 250F | TFT= 400F |
|---|---|---|---|---|---|---|---|---|---|
| Min Voltage at the Coil | 9V | 9V | 9V | 9V | 9.5V | 10V | 11V | 11.5V | 11.5V |

VOLTAGE CONTROL OF A LOCKING DIFFERENTIAL

BACKGROUND OF THE INVENTION

1. Field of the Invention

The invention relates generally to a differential mechanism, which transmits rotating power to the wheels of a motor vehicle and locks to prevent the wheels from rotating at different speeds.

2. Description of the Prior Art

It is conventional to use an open or limited slip differential mechanism to permit limited wheel slip at a vehicle axle, i.e., to produce a rotational speed difference between the driven wheels. A purpose of a locking differential is to prevent relative rotation of one driven wheel with respect to another driven wheel. This is usually accomplished by locking one differential side gear to a differential case, thereby preventing rotation of the side gear with respect to the differential case, and preventing relative wheel speed differentiation across any one axle.

A locking differential can also be used as an inter-wheel differential or as a center differential in 4×4 and AWD vehicles. In this case, the axis of the differential assembly is parallel to the longitudinal axis of the vehicle. The center differential allows drive shaft speed differences between the front and rear axles. But there are some cases where it is desired to lock the front and rear axle drive shafts together such that a single rotation speed is re attained. This condition is known as a locked center differential.

When activated, an electronically locking differential uses a voltage source to produce a magnetic force that overcomes a reactionary spring force applied to a locking ring (mechanical engagement mechanism), thereby mechanically coupling a side gear to a differential case through the lock ring. When activated, the electronic locking differential prevents relative speed differences between the controlled wheels.

If the electronic locking differential is required to function at low voltage and high coil temperature without a temperature compensation strategy, then the electromagnetic hardware, including wire and the coil winding, must have a relatively large size in order to produce a magnetic actuating force that is able to overcome the spring force. The spring force must be set high enough to prevent partial engagement of the lock ring to the side gear during all dynamic vehicle operating conditions.

A need exists in the industry for a control strategy that enables functionality of the electronic locking differential on all road and off-road surfaces, axle fluid temperatures and coil temperature while minimizing the size of the electronic actuating locker hardware.

SUMMARY OF THE INVENTION

A method for controlling a locking differential includes determining a temperature-dependent reference voltage at which a coil locks the differential and determining an electric potential of a voltage source, usually a battery. The battery is used to energize the coil, creates a magnetic force that actuates the lock ring that overcomes the spring reactionary force and locks the differential. If the electric potential of the voltage source is equal to or greater than the reference voltage at a specified coil temperature then the control system is calibrated to allow actuation of the electronic locking differential.

The control system avoids the possibility attempting to lock the differential using an actuating voltage that is too low to fully overcome the return spring or reaction member. The temperature compensation ensures that the magnetic force produced by an electric coil is sufficient to cause clutch teeth on a locking plate to fully engage clutch teeth on a side gear and to competently lock the differential. The temperature compensation strategy reduces the cost and weight of the electromagnetic hardware, i.e., the wiring, coil, air gap, windings, etc., and minimizes the size of these components.

The temperature compensation strategy prevents potential hardware damage due to partial engagement of the clutch teeth on the locking ring with those on the side gear.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
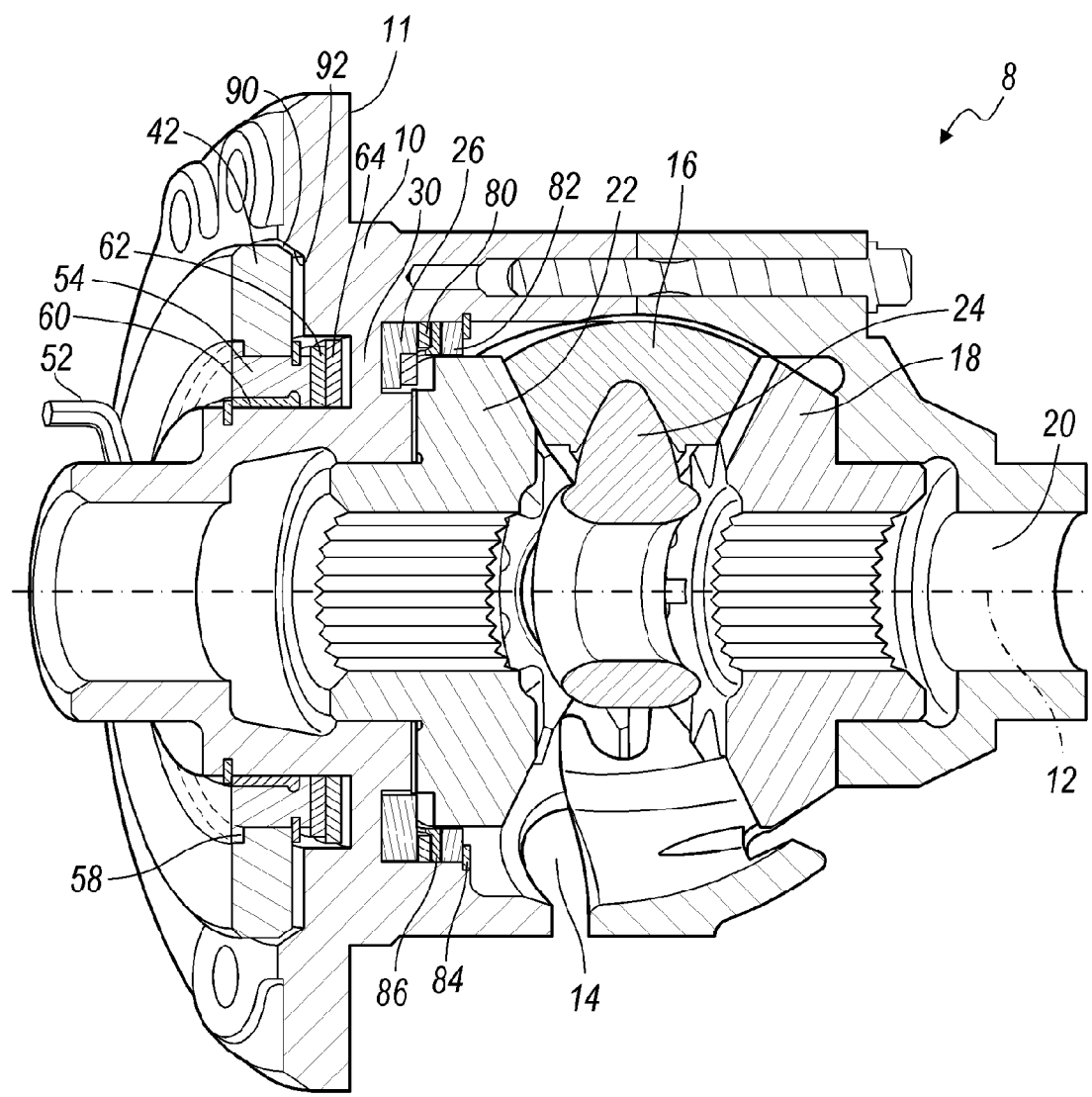
FIG. 1 is a perspective cross section of an electronic locking differential mechanism.
Figure 2:
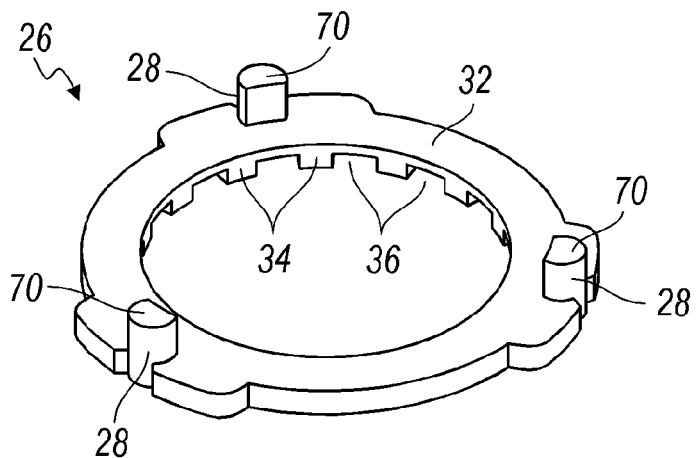
FIG. 2 is an isometric view of a locking ring.

Referring to FIGS. 1-4, an electronic locking differential 8 includes a differential case 10, preferably of cast iron or steel, supported on a stationary housing (not shown) for rotation about a lateral axis 12. A bevel ring gear, secured to the case at the attachment bole holes on the flange 11, drives the case 10 in rotation about axis 12 from an output of a transmission or transfer case.

The case 10 provides an internal chamber 14, which contains bevel pinions 16, a right side gear 18 meshing with the pinions and driveably connected to a right output shaft 20, which extends from the case 10 to a driven wheel of a motor vehicle, and a left side gear 22 meshing with the pinions and driveably connected to a left output shaft (not shown), which extends from the case to a driven wheel at the left side. The pinions 16 are each secured by pins 24 to the rotating case 10, such that the pinions 16 rotate about the axis of pins 24 perpendicular to axis 12, and the pinions and pins 24 rotate about axis 12.

Also located in the case 10 is a locking ring 26, secured to the case such that it rotates about axis 12 and moves axially relative to the case along the axis. The ring 26 is formed with three posts 28, each post extending axially through a hole in web 30, which is formed in the case 10; a planar surface 32 facing the web 30; and a series of clutch teeth 34 and spaces 36 angularly arranged alternately about axis 12 on the axially opposite side of the locking ring from surface 32. The clutch teeth and spaces are adjacent and face the side gear 22.

The side gear 22 is formed with a series of clutch teeth 38 and spaces 40 the teeth 40 angularly arranged alternately about axis 12 on its axial outer face adjacent the clutch teeth 34 and spaces 36 of the locking ring 26. The clutch teeth and spaces of the side gear 22 and locking ring 26 are mutually complementary such that they can engage and disengage as the locking ring moves toward and away from the side gear. The locking ring 26 is normally not engaged with the side gear 22 and permits the side gear to rotate with respect to the differential case 10 and the locking ring, thereby producing an unlocked or disengaged state.

When the locking ring 26 is actuated to engage the side gear 22, their clutch teeth and spaces mesh, thereby driveably connecting the side gear to the locking ring and case 10, preventing the side gear from rotating relative to the case and locking ring, and producing a locked or engaged state.

Figure 4:
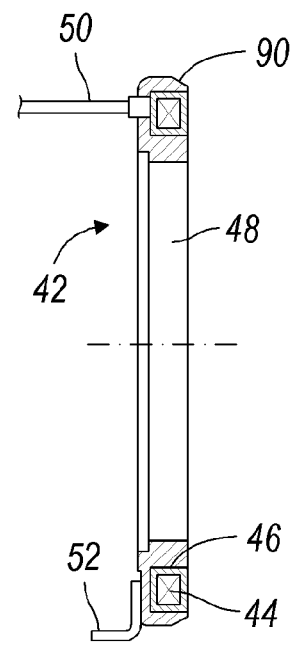
FIG. 4 is a side view of a field core coil assembly.
Figure 3:
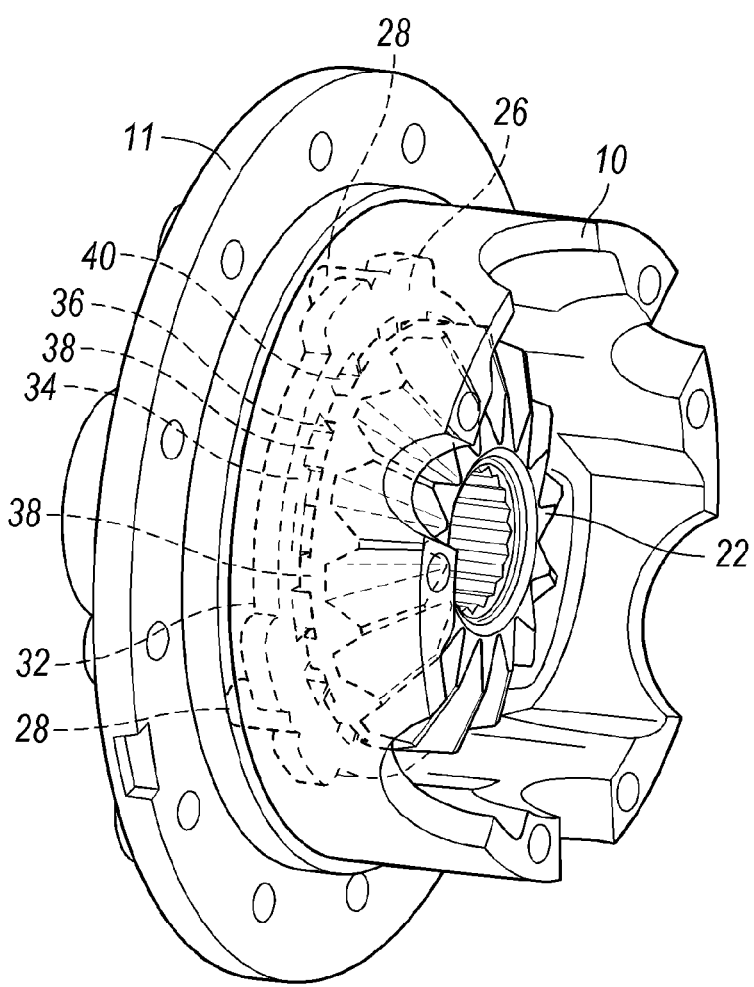
FIG. 3 is an isometric view of the case and clutch.

FIGS. 1 and 4 show a field core coil assembly 42 supported on the case 10 outside the chamber 14. The field assembly 42 includes an electromagnetic coil 44, fitted into an annular recess 46, formed in a ring 48. The coil 44 produces a magnetic field when energized with electric current through the leads 50. The field assembly is secured to the housing by brackets 52, which prevent the coil assembly 42 and coil 44 from rotating. The magnetic field produces an axial force on the coil assembly 42, whose magnitude varies with the width of an air gap 52 between the coil assembly and the case 10.

When the coil 44 is energized, it is attracted to the differential case due to the magnetic field generated by the coil. The coil assembly 42 is fixed against rotation with respect to the differential case 10, but it can translate axially toward and away from the differential case. Axial translation of the coil assembly 42 is transmitted to a sliding collar 54, which is secured to the coil assembly 42 by a press fit and an overlapping rim 58. A bushing 60, which is press fit onto the inside diameter of the sliding collar 54, allows rotation of the case with respect to the sliding collar 54 and coil assembly 42. The bushing 60 also provides a linear guide for the sliding collar 60 and coil assembly 42, allowing them to translate axially.

When the coil 42 is energized, the sliding collar 54 applies an axial force directed rightward to a roller thrust bearing 62 and an annular thrust plate 64. Bearing 62 and thrust plate 64 are located in an annular recess formed in the case. Thrust plate 64 applies axial force to the lock ring 26 through the posts 28 on the locking ring. The posts 28 extend through the axial holes 29 in web 30, causing the locking ring 26 to rotate with the case 10 and allowing the locking ring to move axially relative to the case. The post surfaces 70 are located at the left side of the web 30 adjacent the thrust plate lugs 68.

The locking ring 26 moves into mechanical engagement with the side gear 22 to prevent rotation of the side gear. Springs 80 and 82 are located adjacent to the locking ring 26 and are arranged in series such that spring 80 contacts and applies resilient force to the locking ring, and spring 82 is secured to the case 10 by a snap ring 84 and applies resilient force to spring 80. Preferably springs 80, 82 are wave springs having a corrugations directed radially from axis 12 to their radial outer peripheries, the corrugations being formed with alternating radial ridges and grooves. The springs 80, 82 are separated by a flat plate 86, located axially between the springs, such that the ridges of each spring corrugation contact the plate, thereby preventing mutual contact of the springs. The springs continually apply resilient axial force directed leftward to the locking ring 26 to oppose movement of the locking ring toward the locked position with the side gear 22 in response to the magnetic force produced by the coil 44.

When the coil current is removed, the springs 80, 82 return the locking ring 26 to the disengaged position. The force applied by the springs is sufficient to prevent inadvertent locking of the differential during normal driving conditions when the coil is deenergized. Furthermore, spring 80 has a much lower spring rate than that of spring 82, such that a nonlinear spring force curve is generated. The spring arrangement ensures that the spring force is always lower than the force applied to the locking ring 26 by coil assembly 42 when the coil 44 is energized. Since the force produced by the coil assembly 42 when coil 44 is energized is nonlinear, springs 80, 82 are selected so that the magnitude of the spring force applied to the locking ring 76 is less than the force applied by the coil assembly when energized.

The locking of differential 8 is controlled through a voltage source, coil 44 and locking ring 26. Electric current from a voltage supply, such as a battery, applied to coil 44 creates a magnetic force that actuates the locking ring 26, causing the side gear 22 to engage the differential case 10. When the electronic locker is engaged, coil 44 is cooled by the axle fluid, which directs heat, generated by the constant flow of current, away from the coil.

When the vehicle is stationary, the axle fluid flows back to a sump and the coil 44 is partially submerged in the fluid. The portion of the coil 44 that is not submerged transfers much less heat to the surrounding air than is transferred to the axle fluid, causing the coil to have a higher temperature on the portion of its surface that is not submerged in axle fluid.

When a voltage is applied across the ends of coil 44 and the coil temperature increases, the electrical resistance of the coil increases and electric current in the coil decreases, i.e., current in coil 44 is inversely proportional to its temperature. Consequently, the magnetic force necessary to overcome the force produced by the locking ring return springs 80, 82 also decreases.

Figures 5, 6:
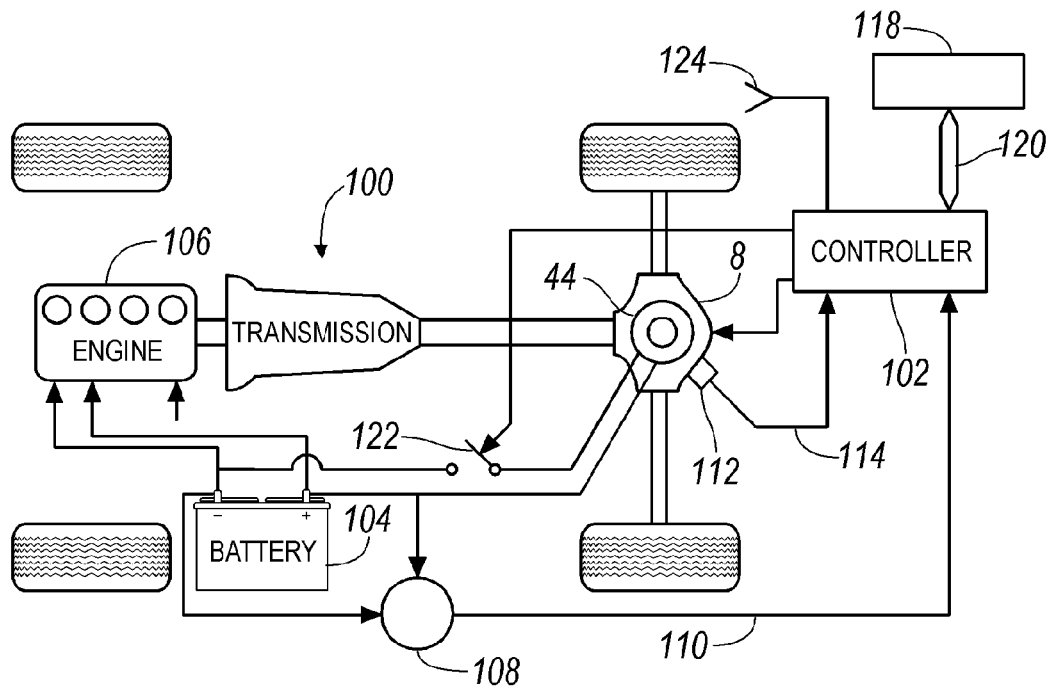
FIG. 5 is schematic diagram of a temperature compensation control system for the differential.
FIG. 6 shows a lockup table relating a minimum voltage for locking the differential and coil temperature.

FIG. 5 illustrates a system 100 that includes an electronic controller 102 for actuating the locking ring 26 of differential 8. The terminals of an electric storage battery 104, such as that used to start an engine 106, are connected to a meter 108, that produces a signal 110, supplied as input to controller 102, representing the current battery voltage. Differential 8 includes a temperature sensor 112, which produces a signal 114, supplied as input to controller 102, representing the current temperature of coil 44 or a temperature representative of the current coil temperature, such as the temperature of the axle fluid in the differential housing 10.

To ensure that the differential locker operates without functional degradation over a temperature range from −40° F. to 300° F., a lookup table 116, stored in electronic memory 118 and accessible to controller 102 through a communications bus 120, relates a minimum coil voltage to temperature of the coil 44.

If the battery voltage is greater than the minimum voltage that corresponds to the current coil temperature set forth in lookup table 116, controller 102 closes a switch 122, completing a circuit that connects the battery terminals to the ends of coil 44. When coil 44 is energized, locking ring 26 secures side gear 22 to case 10, locking the differential 8.

But if the battery voltage is less than the minimum voltage of table 116 corresponding to the current coil temperature, controller 102 opens switch 122, thereby electrically disconnecting the battery terminal from the ends of coil 44, deenergizing coil 44, and allowing the springs 80, 82 to unlock the differential mechanism 8.

Preferably while the available battery voltage is lower than the minimum voltage, the vehicle operator is alerted by a sensible indicator 124, such as a warning lamp or a buzzer or chime on the instrument panel, that the differential 8 cannot be currently locked. Controller 102 actuates the indicator 124 while the available battery voltage is lower than the minimum voltage.

If the locker control system 100 for differential 8 is required to function at low voltages and high temperature without a temperature compensation strategy, then the cost and weight of electromagnetic hardware, i.e., the wiring, coil, air gap, windings, etc., would increase significantly and their size would not meet the packaging requirements.

The temperature compensation prevents potential hardware damage due to partial engagement of the clutch teeth 34 on the locking ring 26 with the clutch teeth on the side gear 22, locking of the locking ring 26 and unnecessary warranty claims due to battery and or alternator failure.

In accordance with the provisions of the patent statutes, the preferred embodiment has been described. However, it should be noted that the alternate embodiments can be practiced otherwise than as specifically illustrated and described.

The invention claimed is:

1. A method for controlling a locking differential, comprising:
   (a) determining a temperature-dependent reference voltage at which a coil locks the differential;
   (b) determining an electric potential of a battery;
   (c) using the battery to energize the coil and lock the differential, if the electric potential is equal to or greater than the reference voltage for a current temperature;
   (d) maintaining the differential unlocked, if the electric potential is less than the reference voltage.

2. The method of claim 1 wherein step (a) further comprises defining reference voltages that correspond to temperatures of the coil over a range of such temperatures.

3. The method of claim 1 wherein step (a) further comprises defining reference voltages that correspond to temperatures representative of the coil temperature.

4. The method of claim 1 wherein step (a) further comprises defining a function that relates the reference voltage to a range of temperature representing the temperature of the coil.

5. The method of claim 1 wherein step (b) further comprises using a battery charge indicator to determine an electric potential of the battery.

6. A system for controlling a locking differential, comprising:
   a coil for producing a magnetic field when energized by the battery;
   a sensor indicating a temperature of the coil;
   a battery;
   a controller configured to determine a temperature-dependent reference voltage at which the coil lock the differential, determine an electric potential of the battery, to use the battery to energize the coil and lock the differential, if the electric potential is equal to or greater than the reference voltage for a current temperature, and to maintain the differential unlocked, if the electric potential is less than the reference voltage.

7. The system of claim 6 wherein the controller is further configured to actuate and indicator that produces a sensible indication that the differential cannot be locked.

8. The system of claim 6 wherein the controller is further configured to accessing a lookup table from which a temperature-dependent reference voltage at which the coil locks the differential is determined.

* * * * *